United States Patent [19]
Mitome et al.

[11] Patent Number: 5,841,548
[45] Date of Patent: Nov. 24, 1998

[54] PRINTING APPARATUS FOR REPRODUCING COPY SETS CONTAINING VARIABLE PAGES AND A SORTING MEANS FOR SEPARATING THE DIFFERENT COPY SETS

[75] Inventors: Kazuyuki Mitome; Kazuyoshi Tokunaga, both of Ibaraki, Japan

[73] Assignee: Hitachi Koki Co., Ltd., Tokyo, Japan

[21] Appl. No.: 607,930

[22] Filed: Feb. 28, 1996

[30] Foreign Application Priority Data

Mar. 10, 1995 [JP] Japan .................................. 7-050855

[51] Int. Cl.$^6$ .............................. H04N 1/04; H04N 1/40; G06F 15/00; G03G 21/00

[52] U.S. Cl. .......................... 358/296; 358/444; 358/498; 395/116; 399/83; 399/403; 399/405

[58] Field of Search .................................... 358/296, 400, 358/401, 404, 443, 444, 448, 498; 399/83, 397, 403–405, 407; 395/115, 116

[56] References Cited

U.S. PATENT DOCUMENTS

| | | | |
|---|---|---|---|
| 5,105,283 | 4/1992 | Forest et al. | 358/401 |
| 5,117,266 | 5/1992 | Takemura et al. | 355/316 |
| 5,493,367 | 2/1996 | Altrieth, III et al. | 399/83 |
| 5,555,099 | 9/1996 | Telle | 358/401 |

*Primary Examiner*—Eric Frahm
*Attorney, Agent, or Firm*—Sughrue, Mion, Zinn, Macpeak & Seas, PLLC

[57] ABSTRACT

A printing apparatus, which includes document data management unit 3 for receiving from a computer document data 5 to be printed and for storing and managing the document data 5, printing unit 1 for printing, on a predetermined sheet of paper, the document data 5 that is output by the document data management unit 3, and document sorting unit 2 for sorting and discharging, onto a sorting tray 22, the sheet of paper that is printed by the printing unit 1, includes: arrangement and editing unit 4 for each destination, for receiving and storing page data for each destination, for employing the page data to calculate a printing number required for each page of a document and for employing the sorting tray 22 for each destination, whereby a printed sheet of a necessary page is discharged onto the sorting tray 22.

7 Claims, 5 Drawing Sheets

PRIRO ART

⇒⇒ : SHEET FLOW
→→ : DATA FLOW

| DOCUMENT PAGE | DESTINATIONS | | | | | | |
|---|---|---|---|---|---|---|---|
| | 1 | 2 | 3 | 4 | 5 | 6 | 7 |
| 1 | 1 | 1 | 1 | 1 | 1 | 1 | 1 |
| 2 | 2 | 2 | | 2 | | | |
| 3 | 3 | 3 | | | 2 | | |
| 4 | 4 | | 2* | | | 2 | |
| 5 | 5 | | 3 | | | | 2 |

REMARKS) 2*: OUTPUTTING FOURTH PAGE OF A DOCUMENT AS PAGE 2 OF REFERENCE MATERIAL FOR DESTINATION 3

FIG. 6

| DESTINATION (SECTION NUMBER) | SORTING TRAY (SHELF NUMBER) |
|---|---|
| 1 | 1 |
| 2 | 2 |
| 3 | 3 |
| 4 | 4 |
| 5 | 5 |
| 6 | 6 |
| 7 | 7 |
| - | 8 |
| - | ⋮ |
| - | ⋮ |
| - | N |

PRINTING APPARATUS FOR REPRODUCING COPY SETS CONTAINING VARIABLE PAGES AND A SORTING MEANS FOR SEPARATING THE DIFFERENT COPY SETS

BACKGROUND OF THE INVENTION

1. Field of the Invention

The present invention relates to a printing apparatus, for a computer, that has an additional function that edits, for each destination, a document arrangement that is performed by the page and prints the result.

2. Description of the Related Art

FIG. 4 is an example of a conventional printing apparatus that has a mechanical document sorter function. Provided are print means 1, document sorting means 2 that sorts printed sheets P that are acquired by the print means 1, and document data management means 3 for supplying to the print means 1 data that relate to the contents to be printed. The conventional control for the document sorting means 2 is comparatively simple, for example, to discharge print sheets P for pages onto a sorting tray (shelf) in the document sorting means 2 or to sort each printed sheet P of each page onto separate shelves of the sorting tray to prepare a reference document that has the same page order. The control for the document sorting means 2 does not require any specific device, and the document sorting means 2 can be easily controlled by the document data management means 3.

It is, however, difficult to vary, according to each destination, the page order of a document that consists of a plurality of pages, and to automatically sort printed sheets. In other words, it is difficult to print a required number of sheets for each page of a document and to automatically arrange them into the page order for each destination. Conventionally, therefore, each page of a document is printed and the resultant sheets are arranged manually in the page order for each destination. The arrangement of a document therefore requires a great amount of human effort, and is a critical factor that leads to an increase in the required indirect labor.

SUMMARY OF THE INVENTION

To overcome the above described conventional shortcomings, it is one object of the present invention to provide a printing apparatus that employs document data and page order data for each destination, and that prints a document with pages assembled in the order that is required for each destination, so as to reduce the human labor that is required for the manual arrangement of a printed document.

To achieve the above described object, a printing apparatus, which includes document data management means for receiving from a computer document data to be printed and for storing and managing the document data, printing means for printing, on a predetermined sheet of paper, the document data that is outputted from the document data management means, and document sorting means for sorting and discharging, onto a sorting tray, the sheet of paper that is printed by the printing means, comprises: arrangement and editing means for each destination, for receiving and storing page data for each destination, for employing the page data to calculate a printing number required for each page of a document and for employing the sorting tray for each destination, whereby a printed sheet of a necessary page is discharged onto the sorting tray.

According to the above described printing apparatus, since the printed sheets provided by the print means are automatically sorted by the document sorting means to sorting trays that correspond to destinations, and since a reference document can be arranged in the page order that is required, the work that is required, following the printing, for the arrangement of the document that is required for each destination can be reduced.

BRIEF DESCRIPTION OF THE DRAWINGS

The above and other objects and features of the present invention will be more apparent from the following description taken in conjunction with the accompanying drawings.

FIG. 6 is a diagram showing data for allocations of sorting trays to destinations that correspond to the page order in FIG. 3.

DETAILED DESCRIPTION OF THE PREFERRED EMBODIMENTS

An embodiment of the present invention will now be described with reference to drawings.

Figure 1:
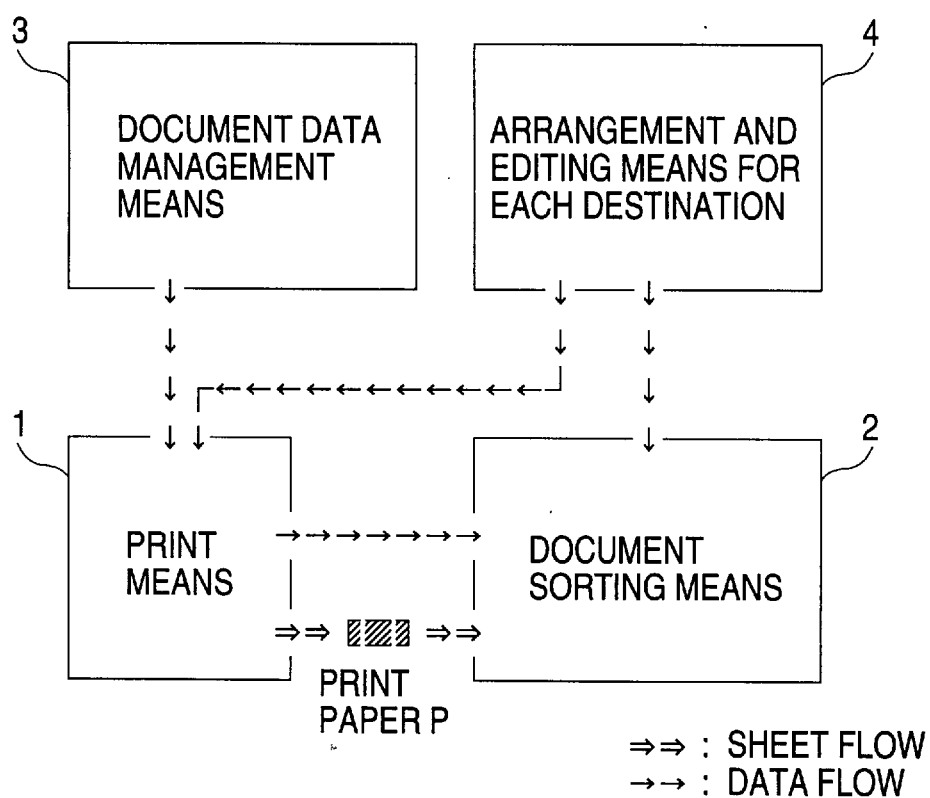
FIG. 1 is a diagram illustrating the arrangement of one embodiment of a printing apparatus of the present invention.

FIG. 1 is a diagram illustrating the arrangement of one embodiment of a printing apparatus according to the present invention. The printing apparatus includes print means 1, for printing characters on a sheet of paper; document sorting means 2, for sorting printed sheets P that are provided by the print means 1; document data management means 3, for supplying to the print means 1 data that relate to the contents to be printed; and arrangement and editing means 4, for transmitting to the document sorting means 2 printed sheets P of pages that are required.

Figure 2:
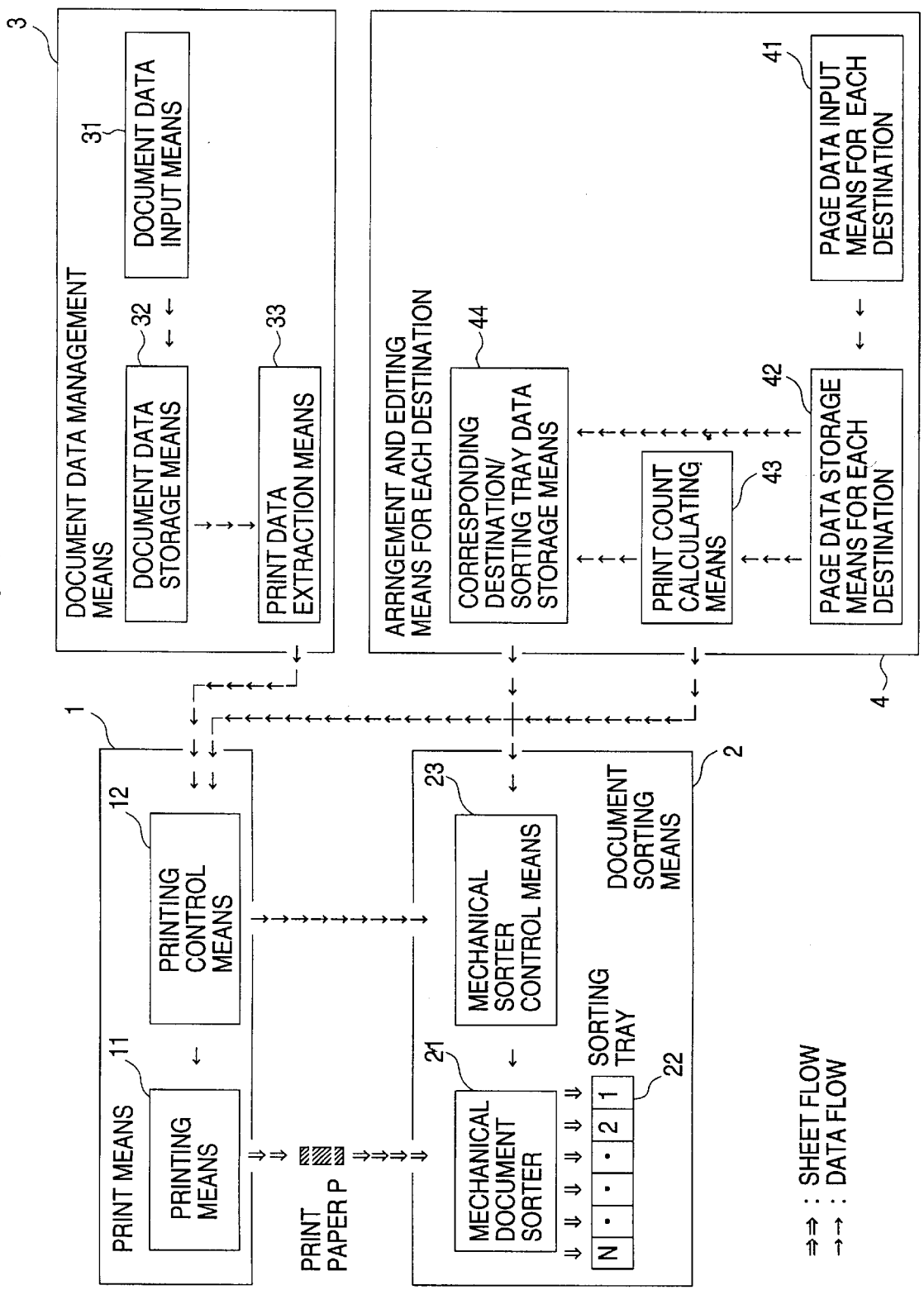
FIG. 2 is a detailed diagram showing the arrangement in FIG. 1.
Figure 3:
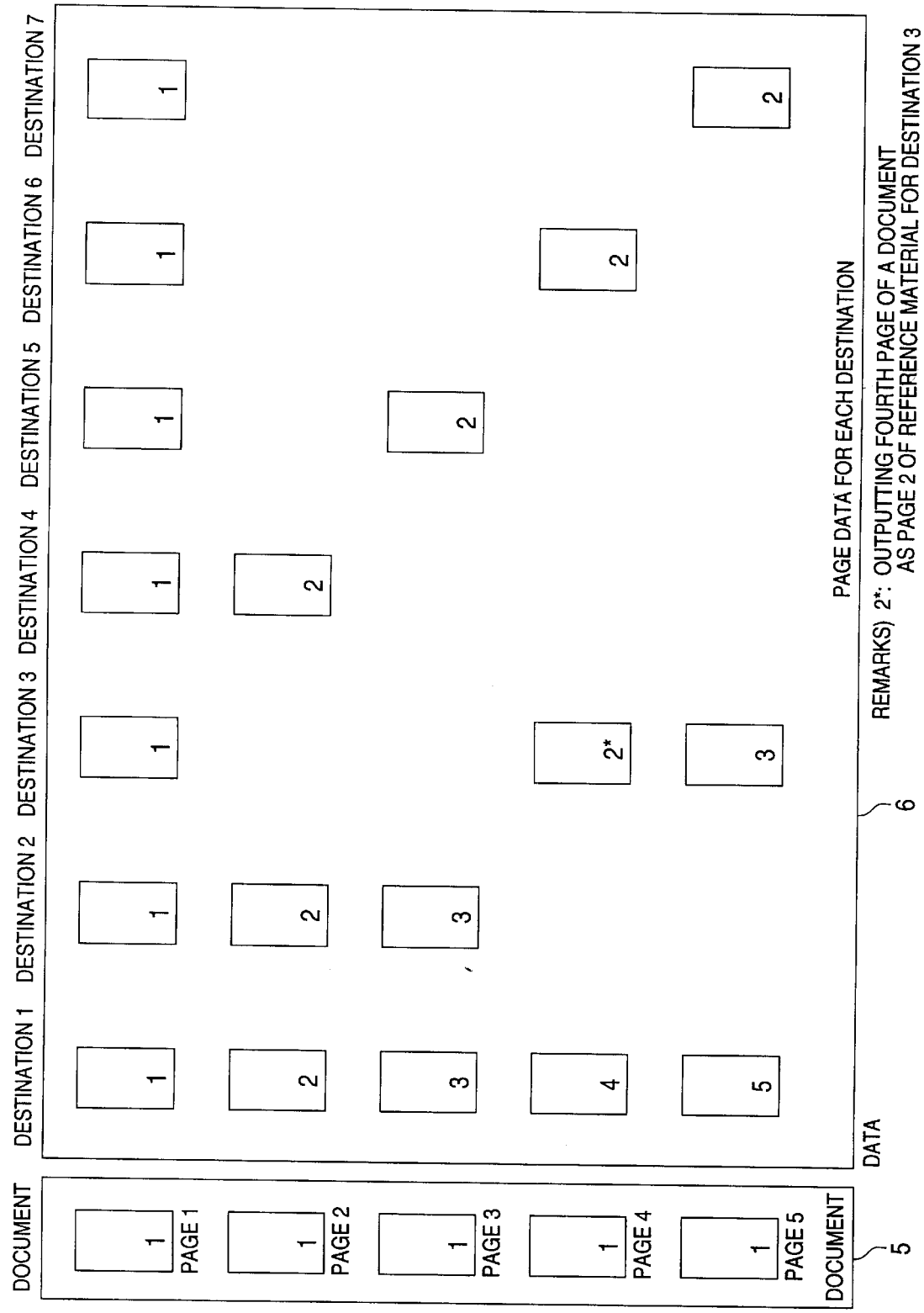
FIG. 3 is a diagram showing an example image for a page order for each destination.

FIG. 2 is a detailed diagram illustrating the arrangement in FIG. 1, and FIG. 3 is a diagram showing an example image of a page structure for each destination. Document data 5 that are transmitted from a computer to be printed are provided by the page, as is shown in the right column in FIG. 3 (In FIG. 3 is shown a document data example that consists of five pages). The document data 5 are inputted from document data input means 31 and are stored in document data storage means 32 in the document data management means 3. In consonance with the condition of the print means 1, etc., the print data to be printed next are extracted from the document data storage means 32 by print data extraction means 33 (e.g., the document data are extracted, for example, by the page in the page order). The data that are extracted by the page are transmitted as print data to the print means 1.

Figures 4, 5:
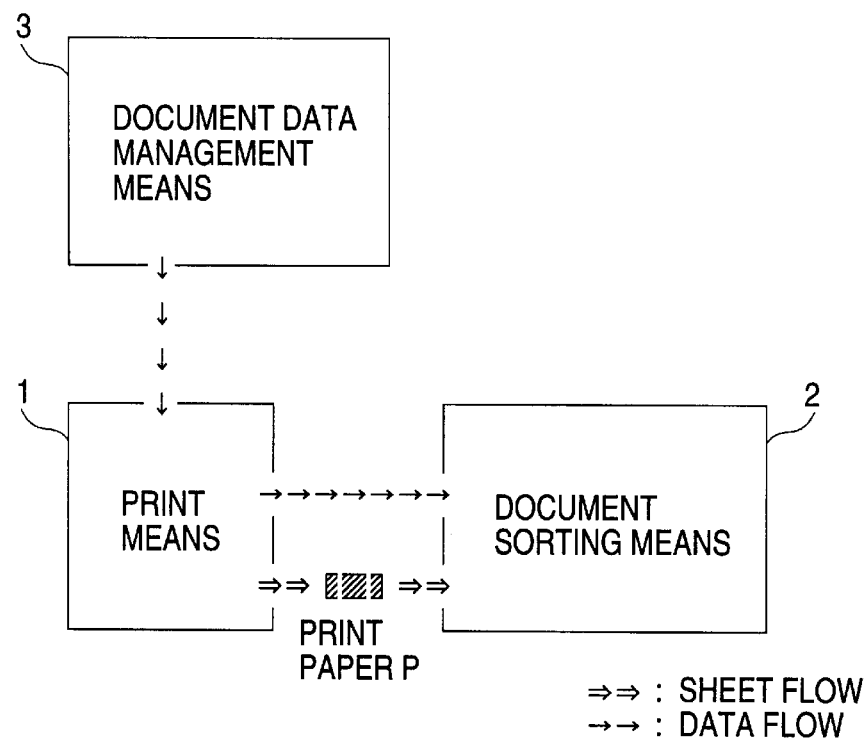
FIG. 4 is a diagram illustrating the arrangement of a conventional printing apparatus.
FIG. 5 is a diagram showing document arrangement and editing data for each destination that corresponds to the page order in FIG. 3.

The arrangement and editing means 4 for each destination performs the arranging and the editing of a document for each destination. During the arrangement and the editing, as shown in FIG. 3, all the pages from 1 through 5 are edited and delivered to destination 1, the three pages from 1 through 3 are edited and delivered to destination 2, and the process is performed for destination 3 and thereafter in the same manner. Data in a format shown in FIG. 5 are prepared relative to the page order data 6 of a document for each destination, are inputted through page order data input means 41 for each destination, and are stored for each destination in page order data storage means. Print count calculation means 43 horizontally counts the figures in the shaded portions in the data format in FIG. 5, which are stored for each destination in the page order data storage means 42, and acquires the number of prints thereafter that are required for each page (the print count for page 1 is seven, the print count for page 2 is three, . . . ). Destination/ sorting tray corresponding data storage means 44 allocates the destinations (section numbers) to individual shelf numbers of a sorting tray 22 in the document sorting means 22, and stores the correlations. N is the total number of the shelves in the sorting tray.

The print means 1 includes printing means 11 and printing control means 12. The print control means 12 receives print data from the print data extraction means 33 and also receives data for a print count for each page from the print count calculation means 43, and controls the printing means 11 in consonance with the received data. The print means 11 prints data on a sheet.

Printed sheets P that are provided by the print means 11 are sorted by a mechanical document sorter 21 in the document sorting means 2 and are discharged to the sorting tray 22, where the printed sheets P are held. Mechanical sorter control means 23 receives the data in FIG. 5 and the data in FIG. 6 from the arrangement and editing means 4 for each destination, determines which shelf of the sorting tray 22 that each printed sheet P of each page goes to, and controls the mechanical document sorter 21 and the sorting tray 22. For example, by referring to FIG. 5, destination 4 is determined to be correct for the fourth printed sheet P of page 1, for which seven sheets are to be printed, and, by referring to FIG. 6, shelf number 4 is selected as the corresponding shelf for destination 4, so that a printed sheet P is forwarded to shelf number 4. In the same manner, the shelf number is selected for each printed sheet P for each page and a printed sheet P is forwarded to each one of the shelves 1 through 7. As a result, a document that has a desired page order can be automatically edited according to the shelf numbers that correspond to the destinations.

The present invention can provide the same effect for the delivery of copies that is obtained by copy machines or facsimile machines.

As was described above, according to the present invention, since it is possible to automatically perform the page arrangement and the editing of a document for each destination, which conventionally depends on human labor, the manual work that is required after the printing can be reduced and the operation speed can be increased.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A printing apparatus for printing a predetermined quantity of selected pages of an input document, comprising:

print means for printing characters on sheets of paper;

document sorting means for sorting said sheets provided by said print means into a plurality of outputs;

document data management means for supplying data relating to the selected pages to be printed to said print means, including data indicating a number of sets of copies to be produced from an input document, data indicating a number of copies of each page of said input document to be copied, and data indicating for each set of copies whether each page of said input document is included in said set of copies; and arrangement and editing means for transmitting the printed sheets to said document sorting means in a required order and for indicating in which of said plurality of outputs a printed sheet will be deposited, wherein said document data management means supplies the data to said print means so that only the selected pages of the input document are produced in each set of copies, respectively.

2. The printing apparatus of claim 1 wherein said print means comprises:

print control means which receives print data from a print data extraction means of said data document management means and data for a print count for each page from a print count calculation means of said arrangement and editing means, for controlling said printing means according to the received data.

3. The printing apparatus of claim 1 wherein said document sorting means comprises:

a mechanical document sorter for sorting printed sheets provided by said print means, and for discharging the sheets to a sorting tray; and mechanical sorter control means which receives data from said arrangement and editing means for each output destination, for determining which shelf of said sorting tray that each printed sheet will go, and for controlling said mechanical document sorter and said sorting tray so that an output document that has a desired page order is automatically edited according to the shelf numbers that correspond to the destinations.

4. A printing apparatus comprising:

print means for printing characters on a sheet of paper to provide printed sheets;

document sorting means for sorting the printed sheets provided by said print means;

document data management means for supplying data relating to contents to be printed to said print means;

arrangement and editing means for transmitting the printed sheets of pages to said document sorting means in a required order and for indicating in which of said plurality of outputs a printed sheet will be deposited;

said document data management means comprises:

document data input means for inputting document data to be printed, which is transmitted from a computer;

document data storage means for storing the document data inputted by said document data input means; and print data extracting means for extracting the print data to be printed succeedingly from said document data storage means according to the condition of said print means and to transmit the print data extracted for each page to said print means;

said arrangement and editing means comprises:

page order data input means for inputting data in a format relative to page order data of a document for each destination;

page order data storage means for storing the data relative to page order data for each destination;

print count calculation means for counting figures in certain portions in the data format which are stored for each destination in said page order data storage means, and acquires the number of prints which are required for each page; and destination/sorting tray corresponding data storage means for allocating the destinations to individual shelf numbers of said sorting tray in the document sorting means, and for storing the correlations;

said print means comprises:

print control means which receives print data from said print data extraction means and data for a print count for each page from said print count calculation, means for controlling said printing means according to the received data; and print means for printing data on a sheet; and said document sorting means comprises:

a mechanical document sorter for sorting printed sheets provided by said print means, and for discharging the printed sheets to said sorting tray; and mechanical sorter control means which receives data from said arrangement and editing means for each destination, for determining which shelf of said sorting tray that each printed sheet of each page goes to, and for controlling said mechanical document sorter and said sorting tray so that a document that has a desired page order is automatically edited according to the shelf numbers that correspond to the destinations.

5. A printing apparatus, comprising:

document data management means for storing and managing document data received from a computer, said document data including data indicating a number of sets of copies to be produced from an input document, data indicating a number of copies of each page of said input document to be copied, and data indicating for each set of copies whether each page of said input document is included in said set of copies;

printing means for printing copies of the input document according to said document data outputted from said document data management means on sheets of paper;

document sorting means having a sorting tray comprising a plurality of outputs for sorting and discharging said sheets of paper printed by said printing means into one of said plurality of outputs of said sorting tray, wherein each of said outputs receives a set of copies according to said document data; and arrangement and editing means which receives and stores page data corresponding to said document data for each of said plurality of outputs of said sorting tray, for employing said page data to calculate a printing number required for each page of a document, and for employing at least one output of said sorting tray for each of said set of copies and providing an indication to said document sorting means so that a printed sheet of a page will be discharged onto one of said plurality of outputs of said sorting tray.

6. A printing apparatus comprising:

print means for printing characters on a sheet of paper to provide printed sheets;

document sorting means for sorting the printed sheets provided by said print means;

document data management means for supplying data relating to contents to be printed to said print means;

arrangement and editing means for transmitting the printed sheets of pages to said document sorting means in a required order and for indicating in which of said plurality of outputs a printed sheet will be deposited;

document data input means for inputting document data to be printed, which is transmitted from a computer;

document data storage means for storing the document data inputted by said document data input means; and print data extracting means for extracting the print data to be printed succeedingly from said document data storage means according to a condition of said print means and to transmit the print data extracted for each page to said print means.

7. A printing apparatus comprising:

print means for printing characters on a sheet of paper to provide printed sheets;

document sorting means for sorting the printed sheets provided by said print means;

document data management means for supplying data relating to contents to be printed to said print means;

arrangement and editing means for transmitting the printed sheets of pages to said document sorting means in a required order and for indicating in which of said plurality of outputs a printed sheet will be deposited;

page order data input means for inputting data in a format relative to page order data of a document for each output destination;

page order data storage means for storing the data relative to page order data for each output destination;

print count calculation means for counting a number of copies of each input page required for each set of said sets of copies and determining a number of prints which are required for each page; and an output destination/sorting tray corresponding data storage means for allocating output destinations to individual shelf numbers of a sorting tray in the document sorting means, and for storing the output destinations.

* * * * *